(12) United States Patent
Glidden et al.

(10) Patent No.: US 12,552,075 B2
(45) Date of Patent: Feb. 17, 2026

(54) MOLDS HAVING SEALABLE COLUMN PIECES AND METHODS OF PRODUCING PRODUCTS THEREWITH

(71) Applicant: GM GLOBAL TECHNOLOGY OPERATIONS LLC, Detroit, MI (US)

(72) Inventors: Douglas Arthur Glidden, Warren, MI (US); Edward Thaddeus Kuczynski, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 109 days.

(21) Appl. No.: 18/512,701

(22) Filed: Nov. 17, 2023

(65) Prior Publication Data

US 2025/0162214 A1 May 22, 2025

(51) Int. Cl.
*B29C 44/58* (2006.01)
*B29C 44/02* (2006.01)
*B29K 105/04* (2006.01)
*B29L 31/58* (2006.01)

(52) U.S. Cl.
CPC .......... *B29C 44/583* (2013.01); *B29C 44/02* (2013.01); *B29K 2105/04* (2013.01); *B29K 2863/00* (2013.01); *B29K 2883/00* (2013.01); *B29L 2031/58* (2013.01)

(58) Field of Classification Search
CPC .......... B29D 11/188; B29C 2045/0425; B29C 44/02; B29C 44/583
See application file for complete search history.

(56) References Cited

FOREIGN PATENT DOCUMENTS

| CN | 200984793 Y | 12/2007 |
| DE | 112011104891 B4 | 1/2018 |
| JP | 2008093931 A | 4/2008 |
| JP | 6363408 B2 | 7/2018 |

*Primary Examiner* — Stella K Yi
(74) *Attorney, Agent, or Firm* — Ingrassia Fisher & Lorenz, LLP | IF&L (57) ABSTRACT

Molds and method of using the molds to produce a product are provided. The molds include a first mold piece having a first wall with a first column member protruding therefrom that includes first sidewalls and a first distal end, and a second mold piece having a second wall with a second column member protruding therefrom that includes second sidewalls and a second distal end. The first and second mold pieces are configured to releasably mate to define a mold cavity therebetween and such that the first and second column members releasably mate with the first distal end being received within a cavity of the second distal end to form a seal therebetween. The mold cavity is configured to receive a product material therein and form the product therefrom. The first sidewalls and the second sidewalls are configured to define a pass through in the product.

18 Claims, 5 Drawing Sheets

MOLDS HAVING SEALABLE COLUMN PIECES AND METHODS OF PRODUCING PRODUCTS THEREWITH

INTRODUCTION

The technical field generally relates to molds, and more particularly relates to a mold having columns within a mold cavity thereof for forming pass throughs in a product formed in the mold cavity, wherein the columns include a pair of column pieces mated to form a seal therebetween.

Molds used in molding processes to produce products may include one or more features within the mold cavity configured to produce pass throughs within the products. For example, molds used to product foam cushions may include one or more columns configured to produce vent holes within the foam cushions. In some molds, the columns each include a pair of column pieces having planar distal ends that are configured to contact (e.g., "kiss-off") upon closing the mold. During molding processing, foam material enter between the column pieces resulting in flashing. In some situations, this flashing must be removed in subsequent processing steps to provide for airflow through the vent holes.

Accordingly, it is desirable to provide molds and methods of producing products with molds that prevents or reduces the likelihood of flashing. Furthermore, other desirable features and characteristics of the present disclosure will become apparent from the subsequent detailed description and the appended claims, taken in conjunction with the accompanying drawings and the foregoing introduction.

SUMMARY

A mold is provided for producing a product. In one example, the mold includes a first mold piece having a first wall with a first column member protruding from the first wall, wherein the first column member includes first sidewalls and a first distal end, and a second mold piece having a second wall with a second column member protruding from the second wall, wherein the second column member includes second sidewalls and a second distal end that includes an opening to a cavity defined by interior walls of the second column member. The first mold piece and the second mold piece are configured to releasably mate with the first wall and the second wall defining a mold cavity therebetween. The first column member and the second column member are configured to releasably mate while the first mold piece and the second mold piece are mated with the first distal end of the first column member being received within the cavity of the second distal end of the second column member and a seal is formed between the first distal end and the second distal end. The mold cavity is configured to receive a product material therein and form the product therefrom. The first sidewalls and the second sidewalls are configured to define a pass through in the product.

In various examples, the first mold piece and the second mold piece of the mold are secured with a hinge and configured to pivot about the hinge to mate with each other.

In various examples, the first sidewalls and the second sidewalls of the mold are flush while the first column member and the second column member are mated.

In various examples, the first distal end of the first column member includes first sloped parting line surfaces that terminate with a protruding surface, the second distal end of the second column member includes second sloped parting line surfaces that terminate with a recessed surface, and the first parting line surfaces and the second parting line surfaces are configured to mate to form the seal between the first distal end and the second distal end.

In various examples, the first distal end includes more than one protrusion and the second distal end includes more than one recess, and each of the more than one recesses are configured to receive a corresponding one of the more than one protrusions.

In various examples, the first column member is a first of more than one first column members of the first mold piece protruding from the first wall, and the second column member is a first of more than one second column members of the second mold piece protruding from the second wall.

In various examples, the mold includes a sealing element on at least one of the first distal end and the second distal end that is configured to promote the seal between the first column member and the second column member while the first column member and the second column member are mated. In some examples, the sealing element includes an epoxy material or a silicone material.

In various examples, the product is a seat cushion for a vehicle, the seat cushion is formed of a foam material, and the pass through is a vent hole.

In various examples, the first column member and the second column member in combination have a total longitudinal dimension of six millimeters or less when mated.

A method is provided for producing a product. In one example, the method includes coupling a first mold piece and a second mold piece of a mold to provide a sealed mold cavity therebetween, the mold cavity defined by a first wall of the first mold piece and a second wall of the second mold piece, wherein coupling the first mold piece and the second mold piece causes mating of a first column member protruding from the first wall and a second column member protruding from the second wall, wherein a first distal end of the first column member is received within a cavity in a second distal end of the second column member and a seal is formed between the first distal end and the second distal end, disposing a product material into the mold cavity, and solidifying the product material to form a product therefrom, wherein first sidewalls of the first column member and second sidewalls of the second column member define a pass through in the product.

In various examples, the first mold piece and the second mold piece are secured with a hinge and coupling the first mold piece and a second mold piece includes pivoting the first mold piece and/or the second mold piece about the hinge to mate with each other.

In various examples, coupling the first column member and the second column member includes disposing the first sidewalls and the second sidewalls relative to each other to be flush while the first column member and the second column member are mated.

In various examples, the first distal end of the first column member includes first sloped parting line surfaces that terminate with a protruding surface, the second distal end of the second column member includes second sloped parting line surfaces that terminate with a recessed surface, and coupling the first column member and the second column member includes mating the first parting line surfaces and the second parting line surfaces to form the seal between the first distal end and the second distal end.

In various examples, the first distal end includes more than one protrusion and the second distal end includes more than one recess, and the method includes mating each of the first distal end and the second distal end by disposing each of the more than one protrusions with a corresponding one of the more than one recesses.

In various examples, the first column member is a first of more than one first column members of the first mold piece protruding from the first wall, the second column member is a first of more than one second column members of the second mold piece protruding from the second wall, and the method includes coupling pairs of the first column members and the second column members.

In various examples, the mold includes a sealing element on at least one of the first distal end and the second distal end, and the method includes mating the first column member and the second column member such that the sealing element promotes the seal between the first column member and the second column member.

In various examples, the mold includes a sealing element on at least one of the first distal end and the second distal end, and the method includes mating the first column member and the second column member such that the sealing element reduces the likelihood of wear on the first column member and the second column member.

In various examples, the product is a seat cushion for a vehicle, the seat cushion is formed of a foam material, the pass through is a vent hole, and the method includes installing the seat cushion in the vehicle.

A mold is provided for producing a product. In one example, the mold includes a first mold piece having a first wall with a first column member protruding from the first wall, wherein the first column member includes first sidewalls and a first distal end, a second mold piece having a second wall with a second column member protruding from the second wall, wherein the second column member includes second sidewalls and a second distal end that includes an opening to a cavity defined by interior walls of the second column member, wherein the first mold piece and the second mold piece are configured to releasably mate with the first wall and the second wall defining a mold cavity therebetween, wherein the first column member and the second column member are configured to releasably mate while the first mold piece and the second mold piece are mated with the first distal end of the first column member being at least partially received within the cavity of the second distal end of the second column member and a seal is formed between the first distal end and the second distal end, wherein the first distal end includes more than one protrusion and the second distal end includes more than one recess, and each of the more than one recesses are configured to receive a corresponding one of the more than one protrusions, and a sealing element on at least one of the first distal end and the second distal end that is configured to promote the seal between the first column member and the second column member while the first column member and the second column member are mated. The mold cavity is configured to receive a product material therein and form a product therefrom, and wherein the first sidewalls and the second sidewalls are configured to define a pass through in the product.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description.

Figure 1:
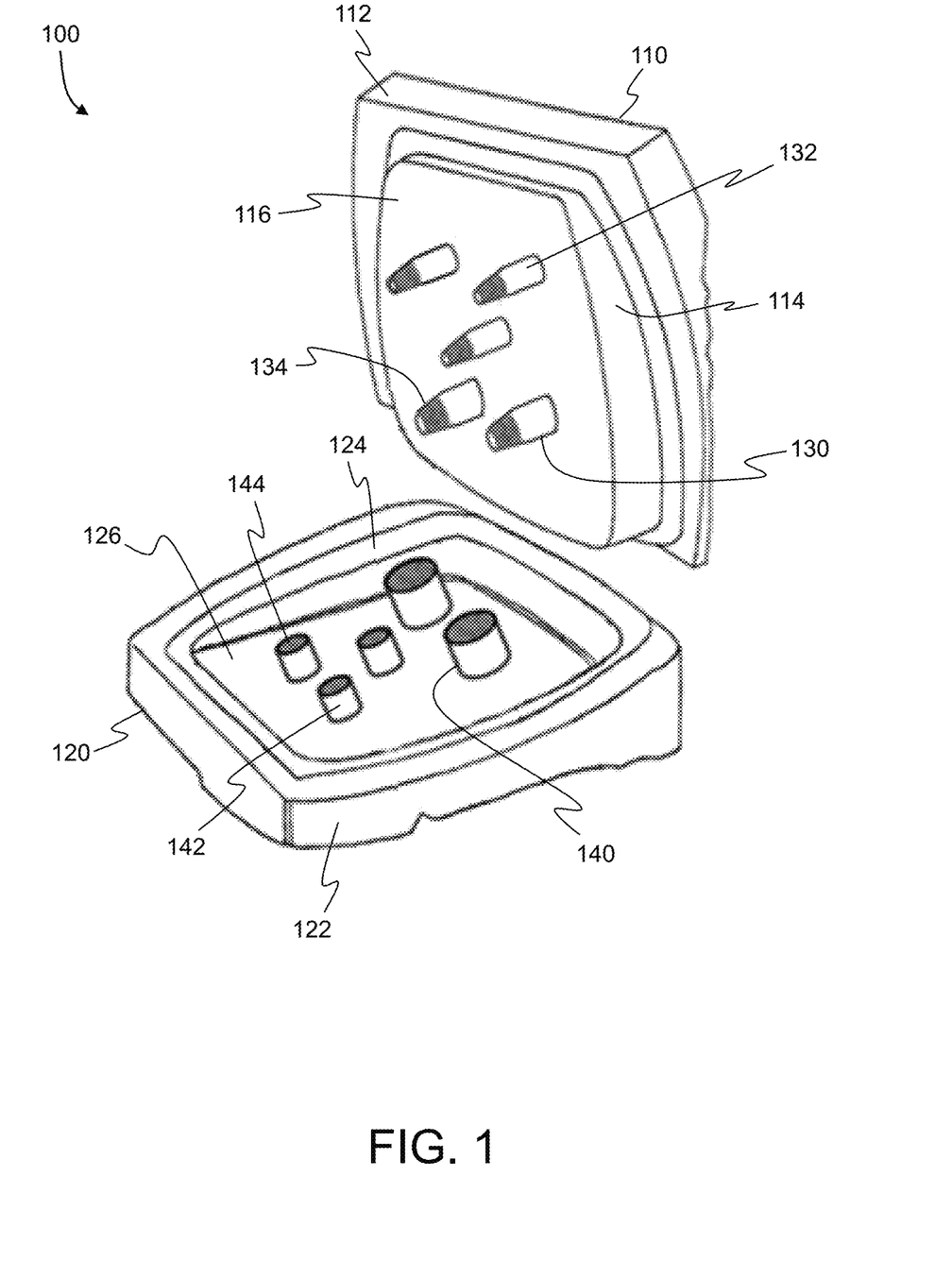
FIG. 1 is a perspective view of a mold in accordance with an example.

Referring initially to FIG. 1, a nonlimiting example of a mold 100 is provided. The mold 100 may be configured for use in a molding process for producing various products from various materials. Specifically, the mold 100 is configured to receive a malleable or viscous liquid product material within a mold cavity thereof and allow the product material to solidify to form a product.

Various materials may be used to form the product within the mold 100 including certain polymeric materials. In some examples, the product may be formed of a thermoset polymeric material and the product material used in the mold 100 may be a prepolymer mixture (reacting resin, reaction material, etc.) that is poured into the mold 100 and allowed to cure, that is, chemically react to produce cross-linking between polymer chains to form a polymer network. The prepolymer mixture may include, for example, a resin, a hardener or crosslinking agent, a filler, a catalyst, a plasticizer, a modifier (e.g., toughening agent), a solvent, an inhibitor, and/or a colorant or pigment. In one example, the product material is a thermosetting prepolymer mixture that includes an isocyanate resin. In some examples, the chemical reaction may produce foaming of the product material resulting in the product being formed of a foam material. In other examples, the product material may include a melt of a thermoplastic resin. In some examples, the mold 100 may be used in an open poring process (e.g., open-poured foam process).

The mold 100 may be used to product various products. In some examples, the mold 100 may be configured for producing certain components for a vehicle, such as a cushion for a seat of the vehicle. However, the mold 100 is not limited to any particular application, nor is the mold 100 limited to any particular size, structure, or configuration.

The mold 100 may include a pair of mold pieces (e.g., lid and bowl), referred to herein as the first mold piece 110 and the second mold piece 120, that are configured to releasably mate or couple to provide a sealed mold cavity therebetween. The first mold piece 110 and the second mold piece 120 may be separate from each other or may be secured to each other, for example, by one or more joints that provide for relative movement of the first mold piece 110 and the second mold piece 120. In some examples, the first mold piece 110 and the second mold piece 120 may be secured to each other by one or more hinges, and the first mold piece 110 and/or the second mold piece 120 may be configured to pivot about the hinge(s) to mate and thereby form the mold cavity.

The first mold piece 110 includes a core or body having first exterior surfaces 112, first sealing or parting line surfaces 114, and first interior surfaces 116. Similarly, the second mold piece 120 includes a core or body having second exterior surfaces 122, second sealing or parting line surfaces 124, and second interior surfaces 126. While the first mold piece 110 and the second mold piece 120 are mated, the first interior surfaces 116 and the second interior surfaces 126 define the mold cavity and therefore define outermost boundaries of the product formed with the mold 100. The first parting line surface 114 and the second parting line surface 124 are configured to contact each other and promote sufficient sealing of the mold cavity to prevent or reduce a likelihood of the prepolymer mixture leaking from the mold cavity during the molding process. Although not shown, the mold 100 may include various components and/or structures to facilitate producing a product with the mold 100. As nonlimiting examples, the mold 100 may include one or more pouring basins, injection ports, mold cavities, gates, sprues, clamps, etc.

The mold 100 includes one or more pairs of first column members 130 and second column members 140. Each of the first column members 130 protrude from the first interior surface 116 of the first mold piece 110 and each of the second column members 140 protrude from the second interior surface 126 of the second mold piece 120. The first column member(s) 130 include first sidewalls 132 and a first distal end 134, and the second column member(s) 140 include second sidewalls 142 and a second distal end 144. In the examples illustrated in the figures, the first sidewalls 132 and the second sidewalls 142 include cylindrical or frusto-conical cross-sections. However, the first sidewalls 132 and the second sidewalls 142 are not limited to any particular cross-sectional structure.

Each of the pairs of the first column members 130 and the second column members 140 are configured to releasably mate at an interface therebetween while the first mold piece 110 and the second mold piece 120 are mated and form the sealed mold cavity. Specifically, the first distal end 134 of the first column member 130 includes a first interface feature configured to interact with a second interface feature of the second distal end 144 of the second column member 140 to form a seal between the first distal end 134 and the second distal end 144 while mated. For example, the first interface feature may include a tapered surface and the second interface feature may include a recess or cavity configured to receive the tapered surface therein, or vice versa.

While the first column member(s) 130 and the second column member(s) 140 are mated, the first sidewalls 132 and the second sidewalls 142 are exposed in the mold cavity and adjacent surfaces thereof may, optionally, be substantially flush. As the mold cavity is filled with the product material and solidified to form the product therefrom, the first sidewalls 132 and the second sidewalls 142 function as barriers to define boundaries of pass throughs (e.g., pass through holes) within the product. In some examples, the interfaces between the first column member(s) 130 and the second column member(s) 140 are sufficiently sealed such that flashing of the product material during the molding process is prevented or substantially reduced.

The mold 100 may include various materials, including certain polymeric, metallic, ceramic, and composite materials. In some examples, the mold 100 may be formed of a steel, aluminum, or aluminum alloy. The mold cavity, as defined by the first interior surfaces 116 and the second interior surfaces 126, may have various shapes and sizes. Similarly, the first column member 130 and the second column member 140 may have various shapes and sizes. In various examples, the first column member 130 and the second column member 140 may in combination have a total longitudinal dimension (e.g., from the first interior surface 116 to the second interior surface 126) of ten millimeters or less, such as eight millimeters or less, such as six millimeters or less, when mated with the seal therebetween. In some examples, the first column member 130 and the second column member 140 may have different longitudinal dimensions. In some examples, the first column member 130 has a longitudinal dimension that is greater than a longitudinal dimension of the second column member 140.

Figure 2:
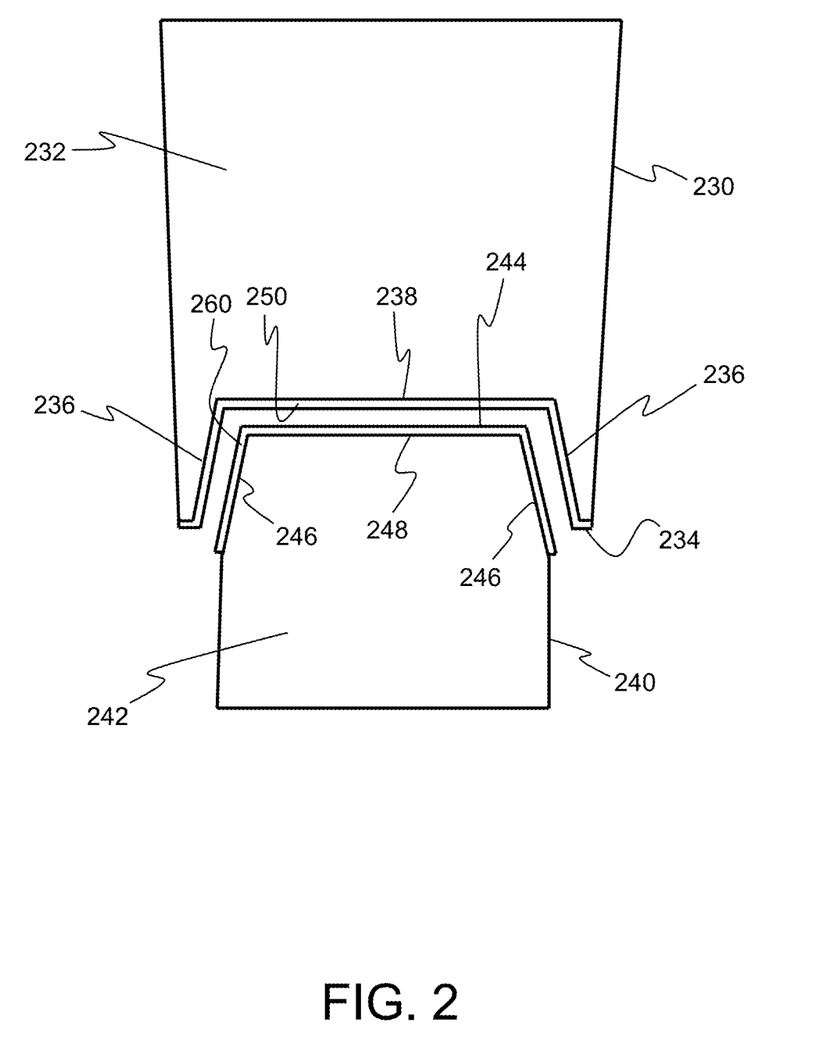
FIG. 2 is a cross-sectional view of a first nonlimiting interface of column pieces of a mold in accordance with an example.
Figure 3:
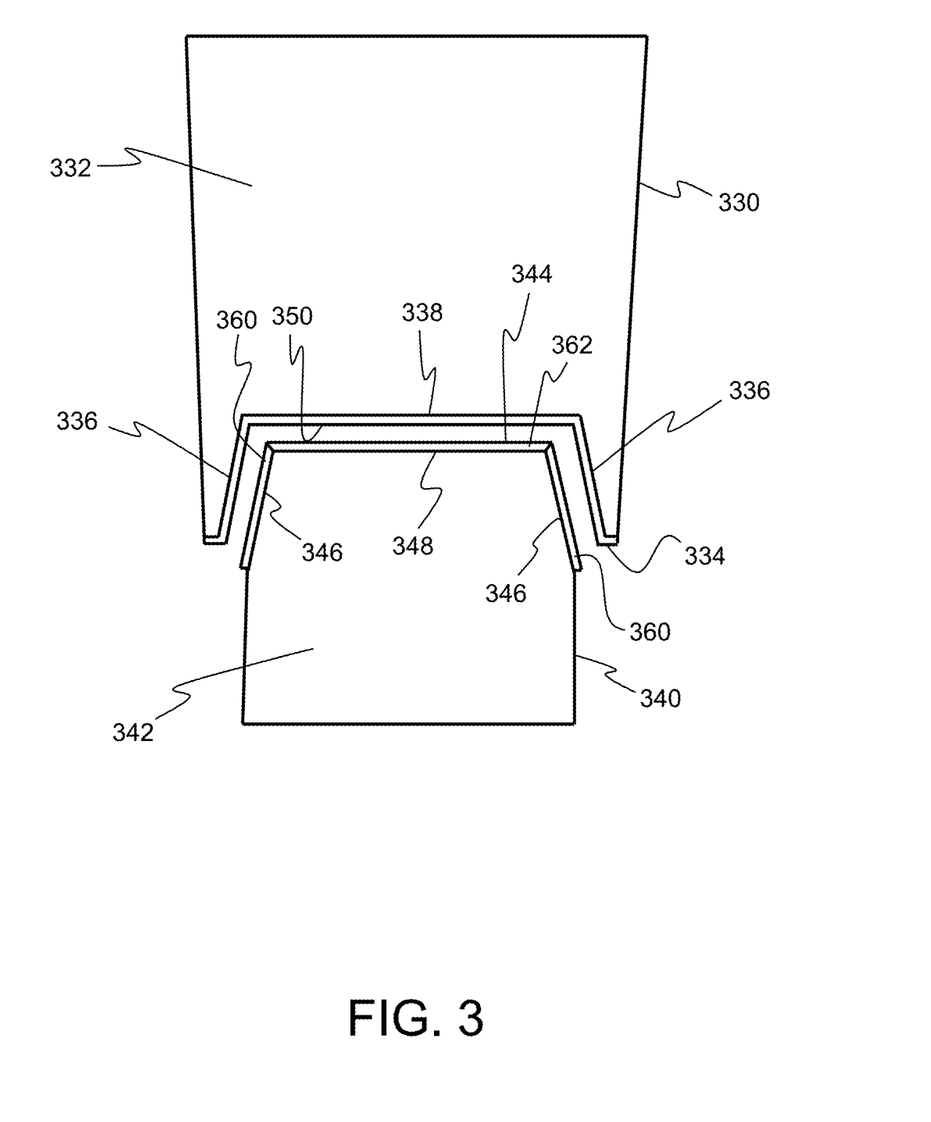
FIG. 3 is a cross-sectional view of a second nonlimiting interface of column pieces of a mold in accordance with an example.
Figure 4:
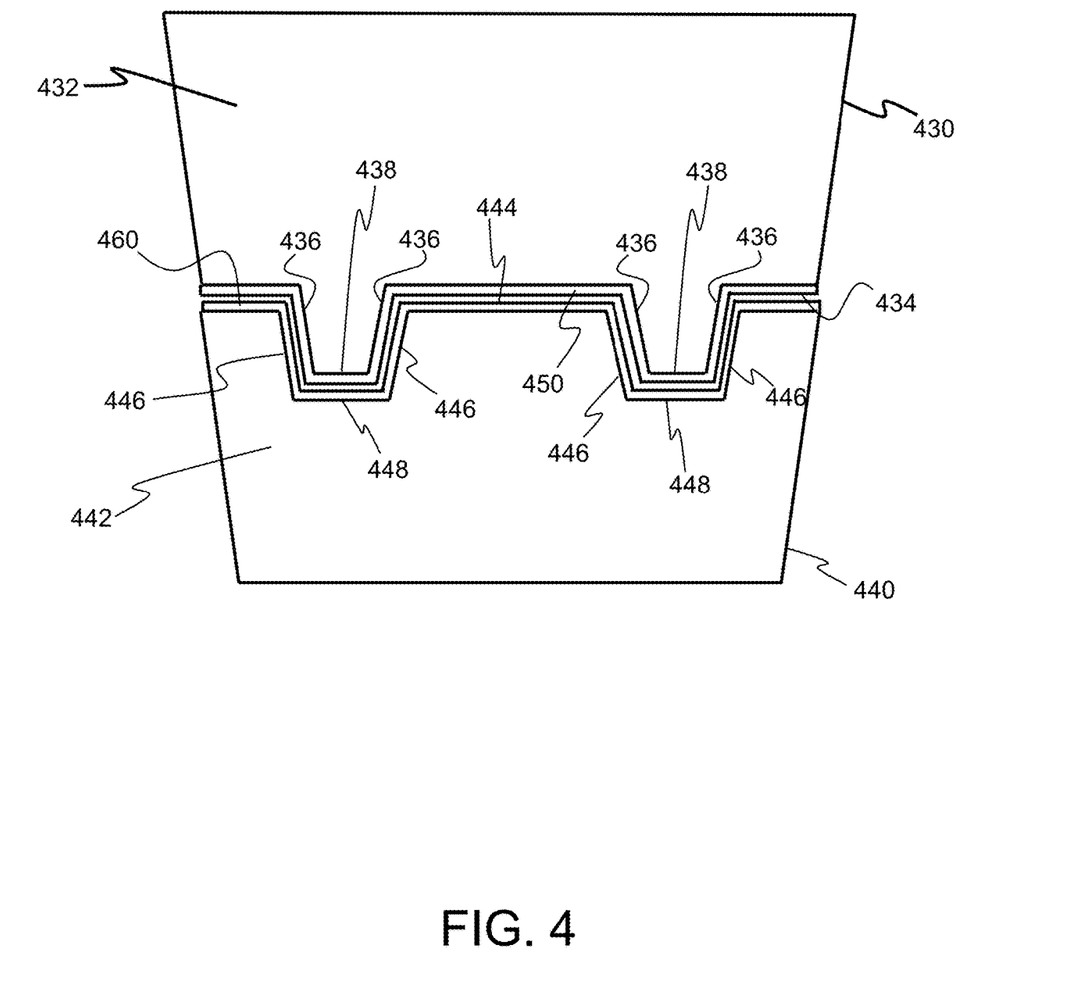
FIG. 4 is a cross-sectional view of a third nonlimiting interface of column pieces of a mold in accordance with an example.

FIGS. 2-4 illustrate various nonlimiting examples of pairs of the first column member 130 and the second column member 140. It should be noted that these examples are merely for illustrative purposes and the mold 100 of FIG. 1 may have other configurations, including various combinations of the components and/or structures represented in FIGS. 2-4.

For convenience, consistent reference numbers are used throughout FIGS. 1-4 to identify the same or functionally related/equivalent elements, but with a numerical prefix (1, 2, or 3, etc.) added to distinguish the particular example from other examples of the of the figures. In view of similarities between the examples, the following discussion of FIGS. 2-4 will focus primarily on aspects of the examples that differ from the other examples in some notable or significant manner. Other aspects of the examples not discussed in any detail can be, in terms of structure, function, materials, etc., essentially as was described for one or more of the other examples, including the example of FIG. 1.

Referring now to FIG. 2, a first column member 230 is provided and includes an opening at a first distal end 234 thereof that provides access to a cavity defined by first tapered or sloped parting line walls 236 and a first recessed wall 238. A second column member 240 is provided that includes a second distal end 244 having second tapered or sloped parting line walls 246 and a second protruding wall 248. In some examples, the first sloped parting line walls 236 and the second sloped parting line walls 246 may extend entirely about peripheries of the first distal end 234 and the second distal end 244, respectively. In some examples, the first sloped parting line walls 236 and the second sloped parting line walls 246 may be radially symmetric (e.g., ring-shaped). In some examples wherein the first sloped parting line walls 236 and the second sloped parting line walls 246 are radially symmetric, the first recessed wall 238 and the second protruding wall 248 may be defined by the symmetric shape of the first sloped parting line walls 236 and the second sloped parting line walls 246 (e.g., circular, square, etc.) Although not shown, the first sloped parting line walls 236 and the second sloped parting line walls 246 are configured to contact each other or be disposed sufficiently close to form a seal between the first column member 230 and the second column member 240 when mated.

In some examples, one or more sealing elements may be disposed on the first distal end 234 of the first column member 230 and/or on the second distal end 244 of the second column member 240. The sealing element(s) may promote a leak resistant seal while the first column member 230 and the second column member 240 are mated, and/or may provide a protective function to the first column member 230 and the second column member 240 to reduce wear thereof. In the example of FIG. 2, the first column member 230 includes a first sealing element 250 disposed on the first distal end 234 and the second column member 240 includes a second sealing element 260 disposed on the second distal end 244. In some examples, the first sealing element 250 may cover an entirety of the first distal end 234. In some examples, the second sealing element 260 may cover an entirety of the second distal end 244. The first sealing element 250 and the second sealing element 260 may be include the same materials or different materials. Nonlimiting materials for the sealing element(s) may include certain epoxy materials or silicone materials.

Referring now to FIG. 3, a first column member 330 and a second column member 340 are provided that have substantially the same structure as discussed in reference to the example of FIG. 2, that is, a first distal end 334 includes an opening that provides access to a cavity defined by first sloped parting line walls 336 and a first recessed wall 338, and a second distal end 344 includes second sloped parting walls 346 and a second protruding wall 348. The first sloped parting line walls 336 and the second sloped parting walls 346 are configured to contact each other or be disposed sufficiently close to form a seal between the first column member 330 and the second column member 340.

In this example, the first column member 330 includes a first sealing element 350 disposed on the first distal end 334, and the second column member 340 includes a second sealing element 360 disposed on the second sloped parting walls 346 and a third sealing element 362 disposed on the second protruding wall 348 of the second distal end 344. The second sealing element 360 and the third sealing element 362 include different materials. The first sealing element 350 may include the same material as either the second sealing element 360 or the third sealing element 362, or may include a different material. With this configuration, the second sealing element 360 and the third sealing element 362 may provide different functions. For example, the second sealing element 360 may be primarily configured to promote a leak resistant seal and the third sealing element 370 may be primarily configured to provide increased wear resistance to the first column member 330 and the second column member 340, such as by providing cushioning.

Referring now to FIG. 4, a first column member 430 is provided that includes a first distal end 434 having a pair of protrusions that each include first sloped parting line walls 436 and a first protruding wall 438. A second column member 440 is provided that includes a second distal end 444 having a pair of recesses that are each defined by second sloped parting line walls 446 and a second recessed wall 448. The protrusions and recesses are provided in pairs that are configured such that the corresponding first sloped parting line walls 436 and the second sloped parting line walls 446 contact each other or are disposed sufficiently close to form a seal between the first column member 430 and the second column member 440 when mated.

In this example, the first column member 430 includes a first sealing element 450 disposed on the first distal end 434, and the second column member 440 includes a second sealing element 460 disposed on the second distal end 444. The first sealing element 450 and the second sealing element 460 may be include the same materials or different materials.

Figure 5:
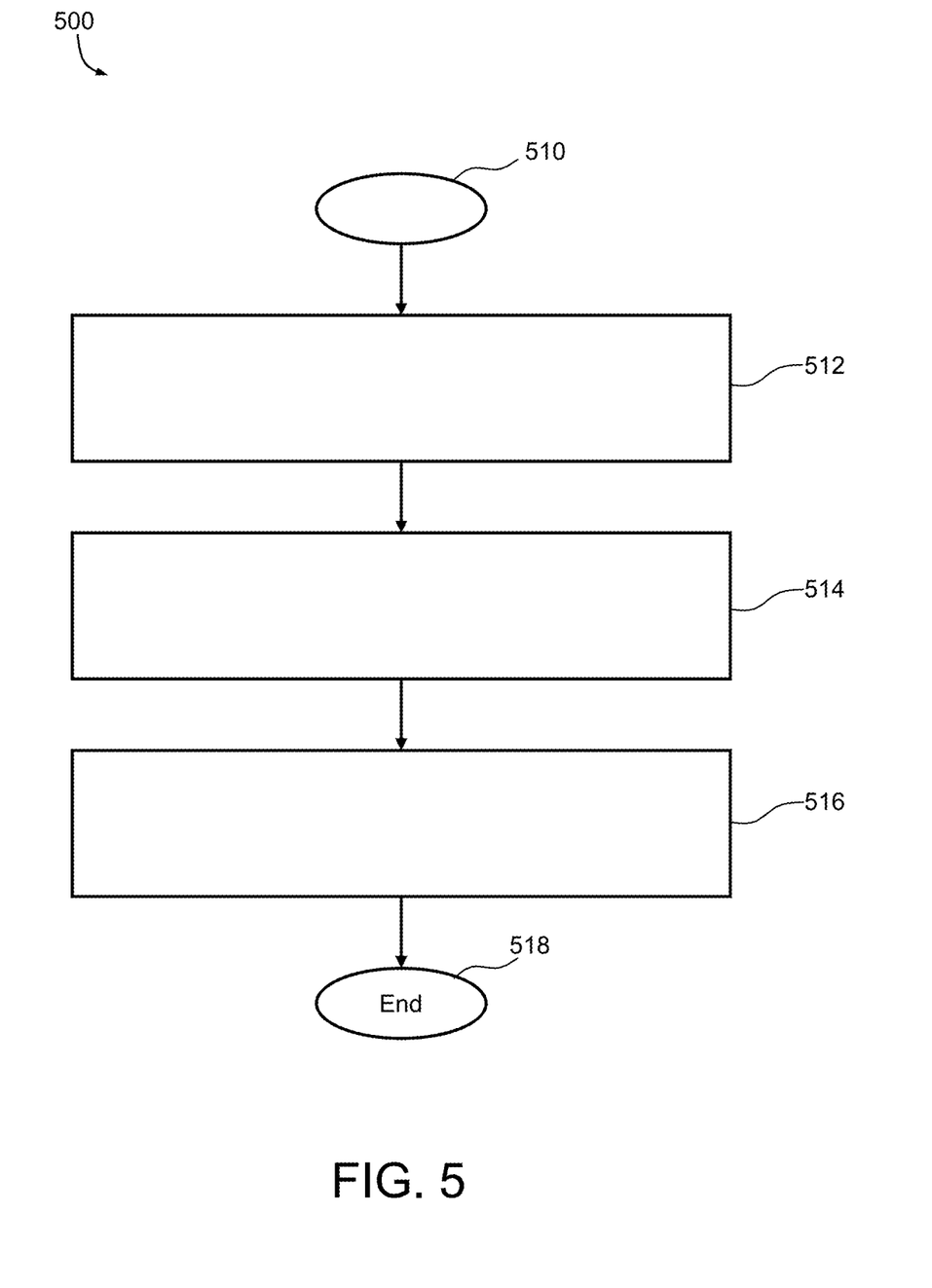
FIG. 5 is flowchart illustrating a method for producing a product from a mold in accordance with an example.

With reference now to FIG. 5 and with continued reference to FIGS. 1-4, a flowchart provides a method 500 for producing a product from a molding process as performed, for example, with the mold 100, in accordance with one example. As can be appreciated in light of the disclosure, the order of operation within the method 500 is not limited to the sequential execution as illustrated in FIG. 5, but may be performed in one or more varying orders as applicable and in accordance with the present disclosure.

In one example, the method 500 may start at 510. At 512, the method 500 may include coupling or mating a first mold piece and a second mold piece of a mold to provide a sealed mold cavity therebetween. The mold cavity may be defined by a first wall of the first mold piece and a second wall of the second mold piece. Coupling the first mold piece and the second mold piece causes mating of a first column member protruding from the first wall and a second column member protruding from the second wall. A first distal end of the first column member is received within a cavity in a second distal end of the second column member and a seal is formed between the first distal end and the second distal end.

At 514, the method 500 may include disposing a product material into the mold cavity while the first mold piece and the second mold piece are mated and sealed. Various methods may be used to dispose the product material within the mold cavity, such as pouring. In some examples, the product material may be disposed in the mold cavity in a manner that produces foaming of the product material (i.e., high porosity).

At 516, the method 500 may include solidifying the product material within the mold cavity to form a product therefrom. An exterior shape of the product may be defined by the first wall and the second wall. The first sidewalls of the first column member and the second sidewalls of the second column member define a pass through in the product. In some examples, the product may be a foam material. In some examples, the pass through may be a vent.

The method 500 may end at 518.

The molds and methods disclosed herein provide various benefits over certain existing molds and methods. For example, providing a seal between the first column member and the second column member may prevent or reduce flashing during solidification of the product material, and thereby promote proper functionality of the product and/or reduce post-solidification processing steps to remove such flashing.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A mold, comprising:
a first mold piece having a first wall with a first column member protruding from the first wall, wherein the first column member includes first sidewalls and a first distal end; and
a second mold piece having a second wall with a second column member protruding from the second wall, wherein the second column member includes second sidewalls and a second distal end that includes an opening to a cavity defined by interior walls of the second column member;
wherein the first mold piece and the second mold piece are configured to releasably mate with the first wall and the second wall defining a mold cavity therebetween, wherein the first column member and the second column member are configured to releasably mate while the first mold piece and the second mold piece are mated with the first distal end of the first column member being at least partially received within the cavity of the second distal end of the second column member and a seal is formed between the first distal end and the second distal end, wherein a sealing element is disposed on at least one of the first distal end and the second distal end that is configured to promote the seal between the first column member and the second column member while the first column member and the second column member are mated, wherein the mold cavity is configured to receive a product material therein and form a product therefrom, and wherein the first sidewalls and the second sidewalls are configured to define a pass through in the product.

2. The mold of claim 1, wherein the first mold piece and the second mold piece are secured with a hinge and configured to pivot about the hinge to mate with each other.

3. The mold of claim 1, wherein the first sidewalls and the second sidewalls are flush while the first column member and the second column member are mated.

4. The mold of claim 1, wherein the first distal end of the first column member includes first sloped parting line surfaces that terminate with a protruding surface, the second distal end of the second column member includes second sloped parting line surfaces that terminate with a recessed surface, and the first sloped parting line surfaces and the second sloped parting line surfaces are configured to mate to form the seal between the first distal end and the second distal end.

5. The mold of claim 1, wherein the first distal end includes more than one protrusion and the second distal end includes more than one recess, and each of the more than one recesses are configured to receive a corresponding one of the more than one protrusions.

6. The mold of claim 1, wherein the first column member is a first of more than one first column members of the first mold piece protruding from the first wall, and the second column member is a first of more than one second column members of the second mold piece protruding from the second wall.

7. The mold of claim 1, wherein the sealing element includes an epoxy material or a silicone material.

8. The mold of claim 1, wherein the product is a seat cushion for a vehicle, the seat cushion is formed of a foam material, and the pass through is a vent hole.

9. The mold of claim 8, wherein the first column member and the second column member in combination have a total longitudinal dimension of six millimeters or less when mated.

10. A method, comprising:
coupling a first mold piece and a second mold piece of a mold to provide a sealed mold cavity therebetween, the mold cavity defined by a first wall of the first mold piece and a second wall of the second mold piece, wherein coupling the first mold piece and the second mold piece causes mating of a first column member protruding from the first wall and a second column member protruding from the second wall, wherein a first distal end of the first column member is received within a cavity in a second distal end of the second column member and a seal is formed between the first distal end and the second distal end, wherein the mold includes a sealing element on at least one of the first distal end and the second distal end, and the method includes mating the first column member and the second column member such that the sealing element reduces a likelihood of wear on the first column member and the second column member;

disposing a product material into the mold cavity; and
solidifying the product material to form a product therefrom, wherein first sidewalls of the first column member and second sidewalls of the second column member define a pass through in the product.

11. The method of claim 10, wherein the first mold piece and the second mold piece are secured with a hinge and coupling the first mold piece and the second mold piece includes pivoting the first mold piece and/or the second mold piece about the hinge to mate with each other.

12. The method of claim 10, wherein coupling the first column member and the second column member includes disposing the first sidewalls and the second sidewalls relative to each other to be flush while the first column member and the second column member are mated.

13. The method of claim 10, wherein the first distal end of the first column member includes first sloped parting line surfaces that terminate with a protruding surface, the second distal end of the second column member includes second sloped parting line surfaces that terminate with a recessed surface, and coupling the first column member and the second column member includes mating the first sloped parting line surfaces and the second sloped parting line surfaces to form the seal between the first distal end and the second distal end.

14. The method of claim 10, wherein the first distal end includes more than one protrusion and the second distal end includes more than one recess, and the method includes mating each of the first distal end and the second distal end by disposing each of the more than one protrusions with a corresponding one of the more than one recesses.

15. The method of claim 10, wherein the first column member is a first of more than one first column members of the first mold piece protruding from the first wall, the second column member is a first of more than one second column members of the second mold piece protruding from the second wall, and the method includes coupling pairs of the more than one first column members and the more than one second column members.

16. The method of claim 10, the mold includes a sealing element on at least one of the first distal end and the second distal end, and the method includes mating the first column member and the second column member such that the sealing element promotes the seal between the first column member and the second column member.

17. The method of claim 10, wherein the product is a seat cushion for a vehicle, the seat cushion is formed of a foam material, the pass through is a vent hole, and the method includes installing the seat cushion in the vehicle.

18. A mold, comprising:
a first mold piece having a first wall with a first column member protruding from the first wall, wherein the first column member includes first sidewalls and a first distal end;
a second mold piece having a second wall with a second column member protruding from the second wall, wherein the second column member includes second sidewalls and a second distal end that includes an opening to a cavity defined by interior walls of the second column member, wherein the first mold piece and the second mold piece are configured to releasably mate with the first wall and the second wall defining a mold cavity therebetween, wherein the first column member and the second column member are configured to releasably mate while the first mold piece and the second mold piece are mated with the first distal end of the first column member being at least partially received within the cavity of the second distal end of the second column member and a seal is formed between the first distal end and the second distal end, wherein the first distal end includes more than one protrusion and the second distal end includes more than one recess, and each of the more than one recesses are configured to receive a corresponding one of the more than one protrusions; and a sealing element on at least one of the first distal end and the second distal end that is configured to promote the seal between the first column member and the second column member while the first column member and the second column member are mated, wherein the mold cavity is configured to receive a product material therein and form a product therefrom, and wherein the first sidewalls and the second sidewalls are configured to define a pass through in the product.

\* \* \* \* \*